United States Patent [19]

Leitermann et al.

[11] 4,016,635

[45] Apr. 12, 1977

[54] METHOD OF MANUFACTURING PISTON SEALING STRIPS OF ROTARY PISTON MACHINES

[75] Inventors: Wulf Leitermann, Bad Wimpfen; Hans-Georg Zimmermann, Heilbronn, both of Germany

[73] Assignees: Audi NSU Auto Union Aktiengesellschaft, Neckarsulm; Wankel GmbH, Lindau Bodensee, both of Germany

[22] Filed: July 15, 1975

[21] Appl. No.: 596,156

[30] Foreign Application Priority Data

July 19, 1974   Germany ........................ 2434838

[52] U.S. Cl. .............................. 29/156.6; 418/178; 277/81 P
[51] Int. Cl.² ......................................... B23P 15/06
[58] Field of Search ...................... 29/156.6, 156.62; 277/81 P, 204; 418/178, 122, 61 A

[56] References Cited

UNITED STATES PATENTS

| | | | |
|---|---|---|---|
| 3,364,547 | 1/1968 | Prasse | 29/156.6 |
| 3,456,624 | 7/1969 | Okamoto | 418/178 |

FOREIGN PATENTS OR APPLICATIONS

| | | | |
|---|---|---|---|
| 472,323 | 3/1951 | Canada | 29/156.6 |
| 542,758 | 1/1942 | United Kingdom | 29/156.6 |

Primary Examiner—C.W. Lanham
Assistant Examiner—Daniel C. Crane
Attorney, Agent, or Firm—Kane, Dalsimer, Kane, Sullivan & Kurucz

[57] ABSTRACT

A method of manufacturing arcuate sealing strips for the pistons of rotary piston machines. The running surface on one face of the strip carries a wear-resistant hard layer.

4 Claims, 5 Drawing Figures

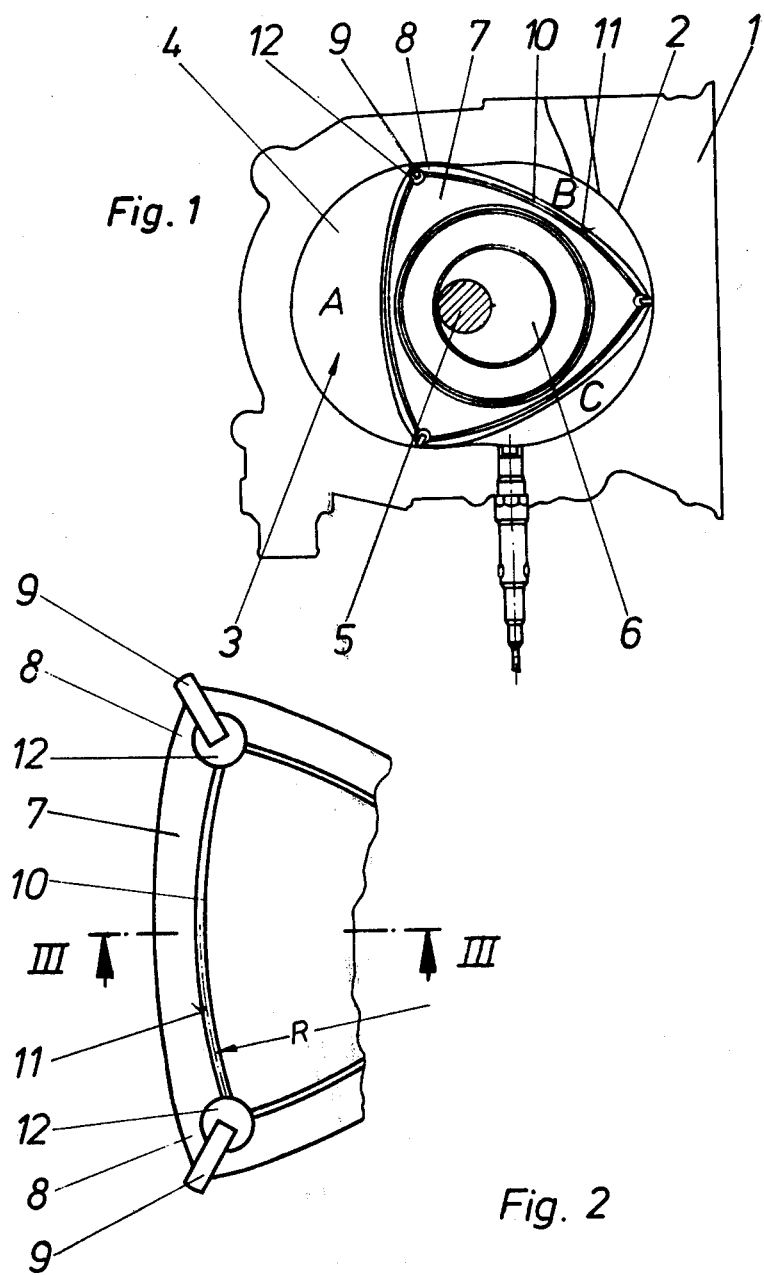

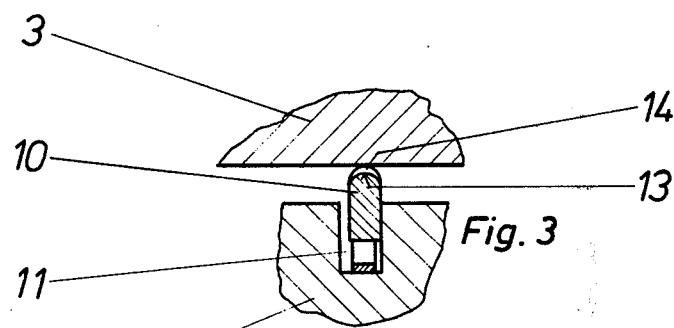
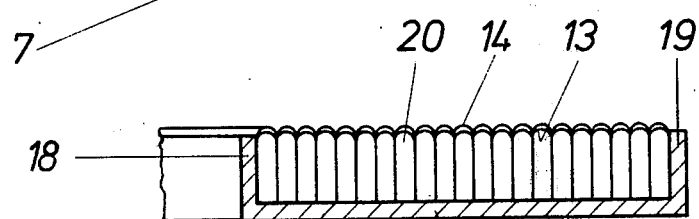
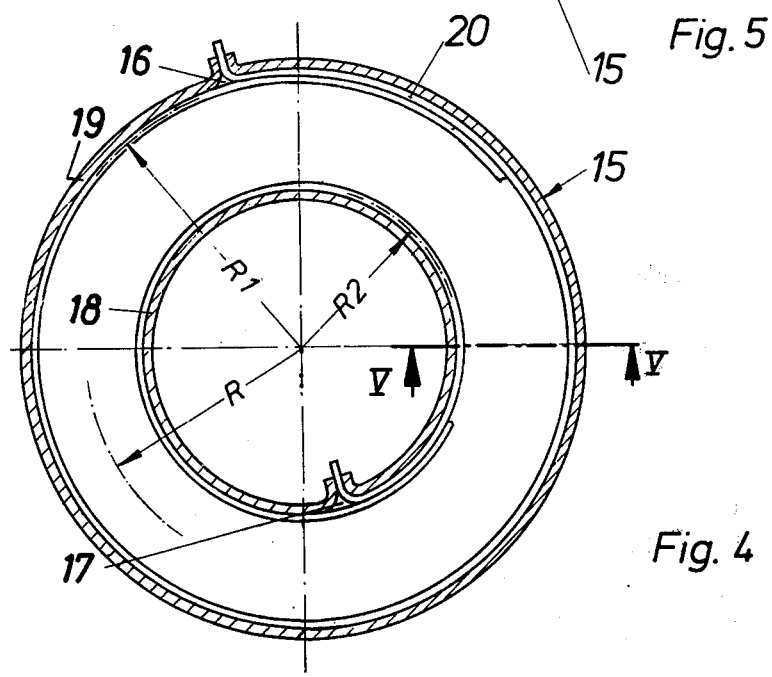

METHOD OF MANUFACTURING PISTON SEALING STRIPS OF ROTARY PISTON MACHINES

BACKGROUND OF THE INVENTION

A method of manufacturing sealing strips for pistons of rotary piston machines is known (German Offenlegungschrift No. 1,601,836) in which the sealing strip is cut from a length of metal strip, then bent to the desired radius of curvature and, subsequently, has a hard layer applied to its running surface. In another known method (German Offenlegungschrift No. 1,601,836) a metal band or strip is formed into a helical coil, then cut off in the longitudinal direction; and the sealing strips formed thereby are provided on their running surfaces with a hard layer. The hand treatment of the individual sealing strips of relatively small cross section which is necessary in these processes is however of appreciable difficulty. Moreover in the application of a hard layer, for example a layer of chromium, it has been found that thicker layers are formed at both ends, and also the material of the layer builds up unevenly at the corners of the side faces. The subsequent work which is required on the individual sealing strips to obtain a usable running surface, and which is performed in special machines involves, however, a high cost and furthermore leads to a relatively high proportion of rejects. In a further known process (German Offenlegungschrift No. 2,349,516) it is proposed instead to cut a metal band up into strips and then coat the sealing strips on their running surfaces in packets and only then bring them to their arcuate shape and cut them to length. In this process likewise one cannot avoid the formation of thicker layers at the ends of the strips; it is true, that these layers are removed on cutting to length but this leads to the requirement that each sealing strip must have a correspondingly greater initial length. Moreover, in this process again, the hand work required on the individual thin sealing strips cannot be avoided; and so, quite apart from the sources of faults which this gives rise to, efficient and commercially practical production is not to be achieved in this way.

SUMMARY OF THE INVENTION

The principal object of the invention is to provide an economical method of manufacturing arcuate sealing strips for the pistons of rotary piston machines of the kind stated in the introduction above.

According to the invention it is proposed that a metal band having the cross-section of the sealing strips should be wound up into a spiral roll, that a wear-resistant layer should then be applied to one face of the rolled up band, and finally that the band should be unrolled and cut up into the individual strips.

By the proposal to roll up a metal band the desired radius for the sealing strips is already produced and the usual relatively large tolerance on the radius allows the formation of a roll of which the radial width corresponds to the tolerance range of the radius. On this basis, a metal band of substantial length can be wound up in a spiral to produce, simultaneously, a very large number of successive sealing strips. After being coated simultaneously on that face of the roll which is to form the running surfaces, the strips are cut to the desired finished length, ready for use. As this roll only has two ends at which large thickened lumps or accumulations of material can form during the coating process, there is a quite negligible wastage of material on cutting up.

So that the wear-resistant layer is applied only on the running surface of the sealing strip, the roll should preferably be wound up so that its turns are close-wound; and the roll is placed, before the application of the wear-resistant coating, in a drum-shaped casing of U-shaped cross section of which the inner and outer peripheral walls engage closely the inner and outer peripheral surfaces of the roll. The side surfaces of the sealing strips are therefore covered over, as are their back surfaces (which are not subject to wear in use) so that the material to be applied cannot penetrate into the gaps between adjacent turns of the roll and between the roll and the casing.

The wear-resistant layer can be applied electrolytically in a manner known in itself and may comprise for example a layer of hard chromium. Alternatively it could be applied by spraying, in which case of example molybdenum or ceramic materials such as, for example, aluminium oxide could be used.

The particular advantage of the process according to the invention lies in that the wear-resistant layer on the running surfaces of the sealing strips is given a uniform thickness throughout by its application to the face of the roll, so that subsequent work on the wear-resistant layer is no longer necessary and accordingly substantially fewer rejects can arise. Moreover the hand work needed during the manufacturing process is much easier and a minimum outlay is needed on containers for coating the running surfaces.

BRIEF DESCRIPTION OF THE DRAWINGS

The invention is explained in the following by way of example with reference to the drawings. In the drawings:

FIG. 1 shows diagrammatically a rotary piston machine of the trochoidal type, with one side wall of its housing removed, FIG. 2 is a view of part of a piston of FIG. 1, FIG. 3 is a section through part of a piston of FIG. 2 with the adjacent wall portion, FIG. 4 is a view of a metal band wound in a spiral and inserted in a casing, and FIG. 5 is a section through the rolled-up metal band of FIG. 4.

DETAILED DESCRIPTION

Referring first to FIG. 1, a rotary piston machine of the trochoidal type is illustrated. The machine housing comprises a centre housing 1 with a two-lobed inner surface 2 and two parallel side walls 3 to define a cavity 4 through which passes a shaft 5 carrying an eccentric 6. Rotatably mounted on the eccentric 6 is a three-cornered piston 7 which carries in its apices 8 radially movable sealing strips 9 which are in sliding engagement with the inner peripheral surface 2 and each strip seals adjacent working chambers A, B, C from one another.

As shown in particular in FIG. 2, the lateral sealing between the piston 7 and the side walls 3 of the housing is achieved by arcuate sealing strips 10 having a mean radius R. The strips are each mounted to be axially movable in a respective arcuate groove 11 in each face of the piston, each groove extending between adjacent apices 8 of the piston. Each sealing strip 10 has its ends connected to link blocks 12 which form the connections with the apex seal strips 9.

In order to improve the sliding characteristics and resistance to wear, as shown in FIG. 3, the running surface on the face 13 of the sealing strip 10, which is in continuous sliding engagement with an adjacent side wall 3, is provided with a wear-resistant hard coating layer 14.

As the mean radius R (FIG. 2) of the sealing strip 10 allows certain variations within a tolerance range, sealing strips 10 with a maximum permitted radius R1 and a minimum permitted radius R2 are still capable of being used. In the manufacture of the sealing strips 10, full use of this tolerance range is made and, advantageously, the sealing strips are not handled individually or in batches but in the form of a rolled up band.

FIG. 4 shows how a metal band 20, of which the cross section already corresponds to the cross section of the sealing strip 10, is wound up spirally to form a roll for manufacturing the arcuate sealing strips 10 and for the application of the wear-resistant layer 14, the turns of the roll being in close mutual contact. The outer radius of the roll corresponds to the maximum permitted radius R1 and the inner radius of the roll corresponds to the minimum permitted radius R2. This roll is inserted in a drum-shaped casing 15 of U-shaped cross section and the two ends of the metal band 20 are brought out of the casing 15 through slots 16 and 17 in the inner peripheral wall 18 and the outer peripheral wall 19 for connection to the cathode of an electrolytic bath. The inner peripheral wall 18 and the outer peripheral wall 19 of the casing 15 lie in close engagement with the inner and outer peripheries of the roll. In this fashion, none of the material which is to be applied can penetrate into the gaps between the turns of the metal band or between the casing and the band. Consequently, the result is achieved that only the faces 13 of the sealing strips 10 are provided with a wear-resistant layer. For this reason, as shown in FIG. 5, the outer peripheral wall 19 and the inner peripheral wall 18 of the casing 15 are deep enough so that only the face of the roll is left exposed.

The roll prepared in this way is provided on its exposed face with a wear-resistant layer, so that a large number of sealing strips in the row are coated simultaneously. The layer can, for example, be applied electrolytically as a hard chromium layer or can be applied by spraying, for example as a coating of molybdenum or of ceramic such as aluminium oxide. In this stage of the manufacture the metal band 20 has at every part of its cross section an arcuate shape corresponding to that of the sealing strips 10 and has a wear-resistant layer 14 on its face. As none of the applied layer can penetrate into the gaps but on the contrary a coherent layer is only provided on the face, the turns of the metal band 20 are easily separated from one another on subsequent unwinding. Simultaneously the band 20 is cut up in a suitable machine to the prescribed length of the individual sealing strips 10 and the resulting strips 10 are immediately ready for use.

In one embodiment by way of example, starting from a mean radius R of 208 mm, with a sealing strip thickness of 0.61 mm the maximum acceptable radius R1 is 238 mm and the minimum acceptable radius R2 is 183 mm. The metal band 20, which is made from piston ring steel, can therefore be rolled up from a total length of about 178 meters so that from one roll one can obtain about 880 individual strips having a chord length of 194 mm.

What is claimed is:

1. A method of manufacturing arcuate sealing strips for the side faces of piston of rotary piston machines, the strips having a maximum and a minimum permissible radius of curvature comprising the steps of; winding a metal band having a cross-section of the sealing strips in a spiral roll the outer radius of which being equal to or smaller than the maximum permissible radius of curvature of the sealing strips and the inner radius of which being equal to or greater than the minimum permissible radius of curvature of the sealing strips, applying a wear-resistant layer to one end face of the roll, unwinding the roll and cutting up the band into individual sealing strips each having a radius of curvature within the maximum and minimum tolerance limits.

2. A method according to claim 1 in which the band is wound up in such a way that the metal band is close-wound and, before the application of the wear-resistant layer, the roll is inserted in a drum-shaped casing of U-shaped cross section, of which the inner and outer peripheral walls are in close contact with the inner and outer peripheral surfaces of the roll.

3. A method according to claim 1 in which the wear-resistant layer is applied electrolytically.

4. A method according to claim 1 in which the wear-resistant layer is applied by spraying.

* * * * *